No. 868,563. PATENTED OCT. 15, 1907.
E. HOLZMANN.
FISHING ROD GUIDE.
APPLICATION FILED FEB. 25, 1907.
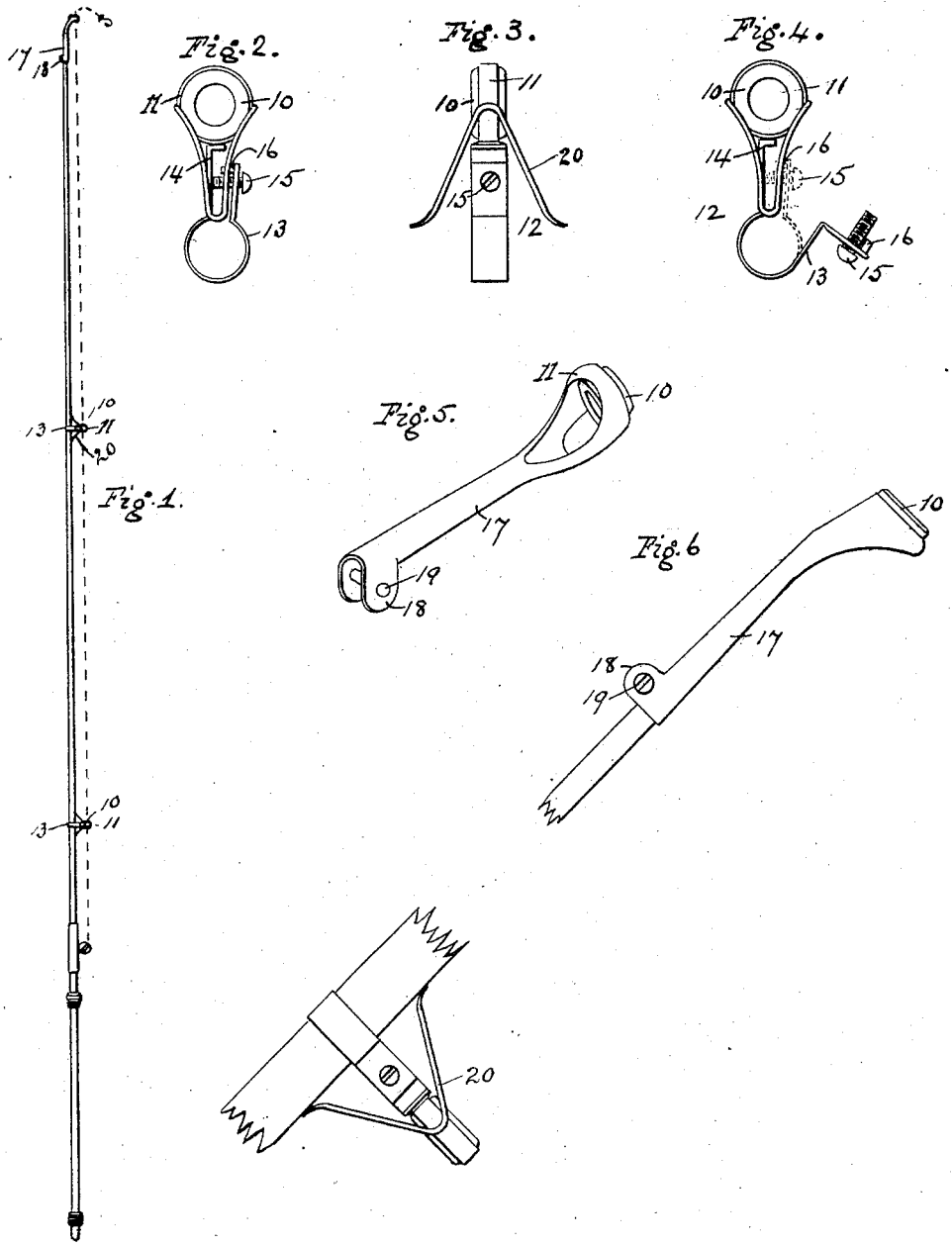
WITNESSES
INVENTOR
Ernest Holzmann
BY Howson and Howson
ATTORNEYS

UNITED STATES PATENT OFFICE.

ERNEST HOLZMANN, OF BROOKLYN, NEW YORK.

FISHING-ROD GUIDE.

No. 868,563.

Specification of Letters Patent.

Patented Oct. 15, 1907.

Original application filed March 16, 1906, Serial No. 306,358. Divided and this application filed February 25, 1907. Serial No. 359,220.

*To all whom it may concern:*

Be it known that I, ERNEST HOLZMANN, a citizen of the United States of America, residing in the borough of Brooklyn, in the county of Kings and State of New York, have invented certain new and useful Improvements in Fishing-Rod Guides, of which the following is a specification.

This invention relates to guides for fishing rods, and has for its object to construct a guide which is adjustable upon the rod and is provided with a device to prevent the line from winding around the guide as it runs out on a cast.

My guide is described and shown in my application Serial Number 306,358 of which this forms a division.
In the accompanying drawings Figure 1 is a side view of a pole to which my guides are attached; Fig. 2 is a side view of one of the guides drawn to an enlarged scale; Fig. 3 is a view at right angles to Fig. 2; Fig. 4 is a view similar to that shown in Fig. 2, with the clamping means open for the adjustment of the guide to the rod; Fig. 5 is a perspective of the guide for the tip and Fig. 6 is a side view of a pole similar to Fig. 1 but drawn to a larger scale and showing the pole partially broken away.

It is commonly known that a fishing rod used for casting soon becomes bent from the repeated strains in the same direction to which it is thereby subjected. To remedy this defect I have provided an adjustable guide of the character shown in the accompanying drawings. As appears therefrom; the guide consists of an agate ring 10, surrounded by a metal band 11, which is secured to a clamping device 12. For the latter I have shown a spring eye having a free shank 13 provided with a suitable means for securing the same to the shank 14, which is attached to the metal band 11. A screw 15 passing through a hole in the free shank and engaged in a screw threaded hole in the shank 14 serves this purpose. A stop 16 may be advantageously added toward the outer end of the free shank, so as to render the screw more efficient. Similarly the tip guide 17 may be secured by means of lugs 18 projecting from its inner end and drawn together by means of a screw 19. By making the guides adjustable in this manner they may be moved not only circumferentially around the pole, but also lengthwise, and the fisherman is thereby enabled to counteract the bending of his pole by adjusting his guides to a position on the opposite side of the pole and at any point desired throughout its length.

In casting, another difficulty is encountered through the tendency of the line to belly out between the guides towards the end of the cast when the reel continues to run at high speed, while the speed of the casting weight, and with it the running out of the line, decreases. Accompanying this tendency is the danger that the line will wrap itself around the pole or loop around the guides. To avoid this I lift the running rings 10 well away from the pole and provide guards 20 which serve to throw the line up and off the guide post in case it should tend to wrap itself around the same. This guard device may be variously constructed and I do not limit myself to the particular form shown.

I claim as my invention

1. A guide for fishing rods, in combination with a guard therefor, substantially as described.

2. A guide for fishing rods provided with a clamp adjustable circumferentially and lengthwise of the rod, in combination with a guard therefor, substantially as described.

3. A guide for fishing rods having means for holding the running rings at a distance from the pole, in combination with a guard therefor, substantially as described.

In testimony whereof I have signed my name to this specification, in the presence of two subscribing witnesses.

ERNEST HOLZMANN.

Witnesses:
 WALTER ABBE,
 HUBERT HOWSON.